UNITED STATES PATENT OFFICE.

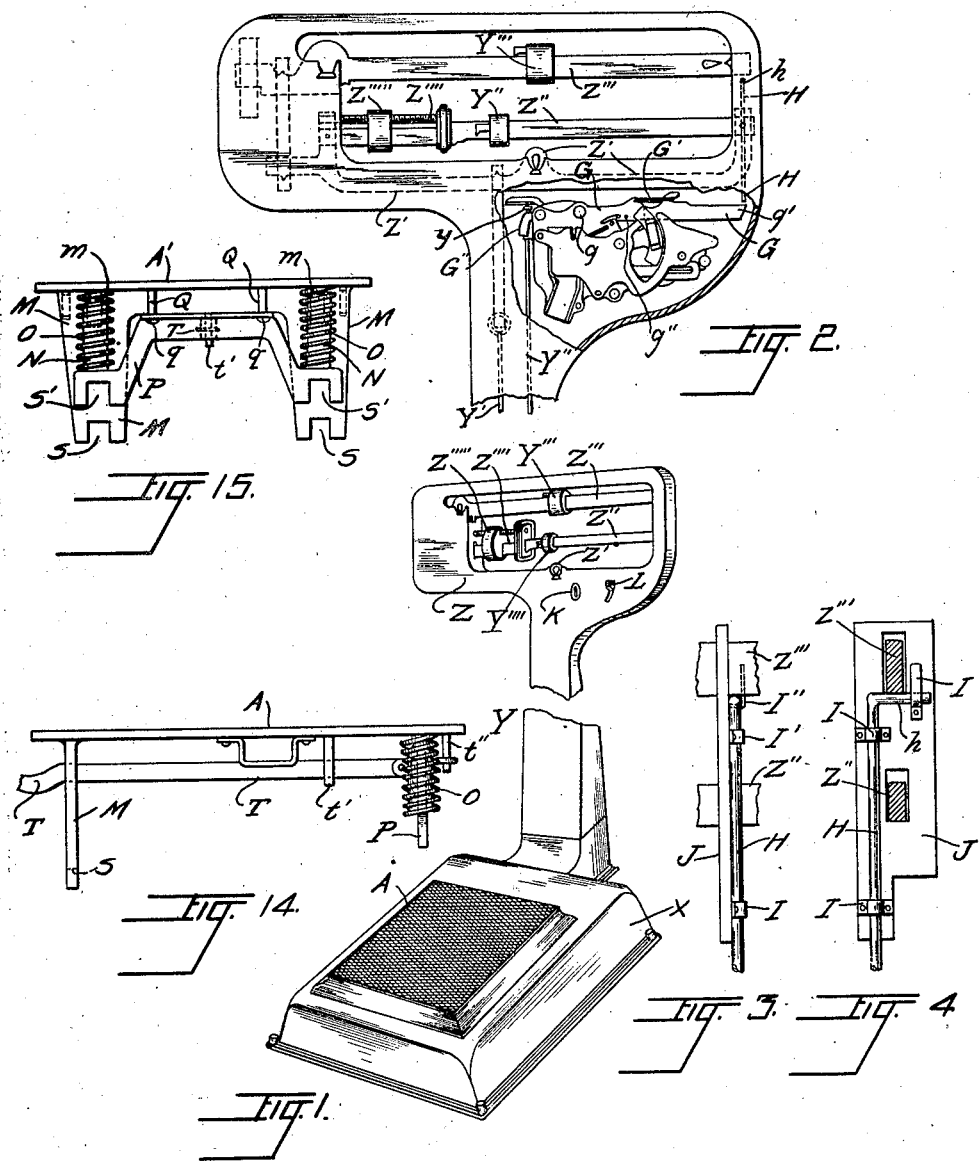

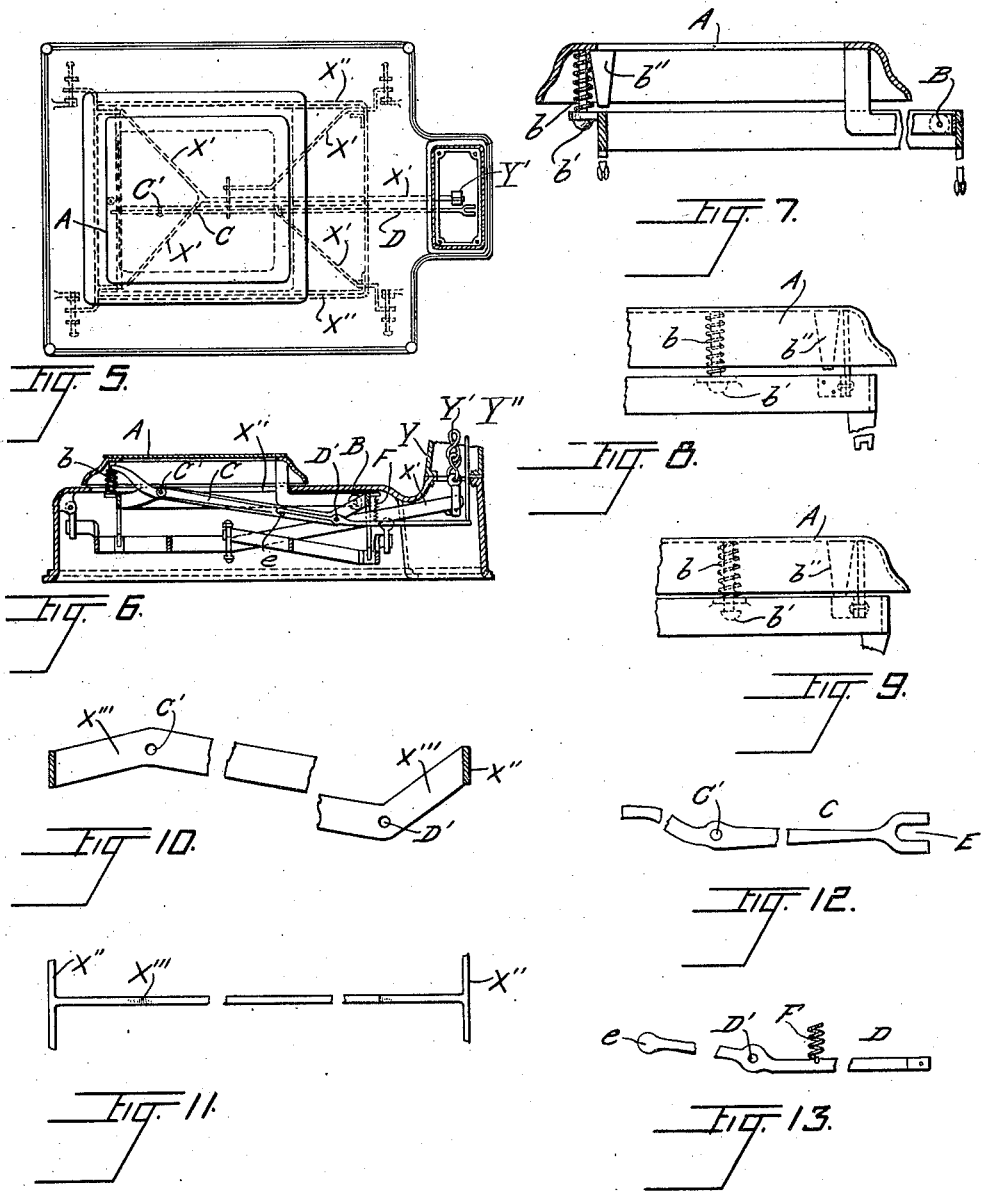

JOSEPH PAUPA AND GUSTAV F. HOCHRIEM, OF CHICAGO, ILLINOIS.

WEIGHING MECHANISM.

1,043,353.   Specification of Letters Patent.   Patented Nov. 5, 1912.

Application filed November 6, 1911. Serial No. 658,827.

*To all whom it may concern:*

Be it known that we, JOSEPH PAUPA and GUSTAV F. HOCHRIEM, citizens of the United States, and residing at Chicago, in the county of Cook and State of Illinois, have invented certain new and useful Improvements in Weighing Mechanism, of which the following is a specification.

This invention relates to weighing mechanisms which are joined to coin controlled mechanisms.

The object of this invention is to obtain sufficient movement of certain elements of the weighing mechanism as to render the indicating elements of said weighing mechanism inoperative without that a coin is deposited in the coin controlled mechanism which is joined to the weighing mechanism and certain determined operations of said coin mechanism are performed.

A further object of the invention is to obtain a weighing mechanism provided with weighing beams having sliding weights thereon which when joined to coin controlled mechanism, is not liable to get out of order, and which is accurate in operation, when a weighing is effected.

A further object is to obtain a weighing mechanism which, when joined to coin controlled devices, operates to ascertain the weight of a person or thing on the platform thereof in the same manner and with the same accuracy as do scales (having weighing beams) which are not designed to be so attached.

A further object is to obtain weighing mechanism which cannot be gotten out of order during the operation or partial operation thereof or because of the failure to operate the coin controlled mechanism which is joined thereto.

A further object in the invention is to obtain weighing mechanism provided with weighing beams and sliding weights thereon of which the elements which are joined to coin controlled mechanism operate independently of and prior to the operation of the elements of the weighing mechanism which determine the weight of the person or thing on the platform thereof.

This device is embodied in scales which are provided with a base, a standard and a head, the said base having therein a weighing frame mounted in the ordinary way on weighing levers and a platform on said levers, the said standard hollow and having therein a longitudinally movable rod and the said head having a scale with two members exposed to view, mounted in the ordinary way and provided with sliding weights, the said longitudinally movable rod connected at its lower end to the weighing levers and at its upper end to the scale beam in the ordinary way, to transmit motion of the weighing frame to the scale beam.

In the drawings Figure 1 is a perspective view of a weighing scales with the device embodying our invention applied thereto. Fig. 2 is a front elevation of the head of the weighing scales having our device applied thereto, with a portion of the front face of said head removed to expose to view the portion of the device embodying our invention which is located in said head. Fig. 3 is an edge view of a plate which is attached to the head of the scales and of a vertically movable rod mounted on said plate showing a small portion of two of the members of the weighing beam in elevation. Fig. 4 is a front elevation of the plate and rod which are illustrated in Fig. 3, showing the two members of the scale beams in section. Fig. 5 is a plan view of the base and platform of a scales, showing a horizontal sectional view of the standard of the base with the platform illustrated in Figs. 7 and 8, thereon and with the operative mechanisms in said base indicated by broken lines. Fig. 6 is a vertical sectional view of the base, of the scales, the platform and the standard thereof and the weighing levers, weighing beams and remaining operative parts which are located in said base and standard. Fig. 7 is a vertical view of a portion of the weighing frame of a scales to which the device embodying our invention is joined and of the platform and connections forming a part of our invention which is mounted on said weighing frame. Fig. 8 is a side elevation of one side of the weighing frame, and of the platform thereon, viewed at an angle of 90 degrees from the view thereof illustrated in Fig. 7 with the platform raised. Fig. 9 is a side elevation of the side of the weighing frame and platform illustrated in Fig. 8 with the platform of the device depressed. Fig. 10 is an elevation of the central bar of the weighing frame with the end bars of said frame shown in vertical section. Fig. 11 is a top plan view of the central bar of the weighing frame and of a portion of the end bars of said frame, Figs. 12 and 13 are, respectively, side elevations of levers pivotally mounted on the central bar of the weighing frame. Fig. 14 is an end elevation of a modification of the platform of the device and a lever thereon, forming elements in the device embodying our invention. Fig. 15 is a front elevation of the modification illustrated in Fig. 14. Figs. 2, 3, 4, and 7 to 15, (both inclusive), are on an enlarged scale from Figs. 1, 5, and 6.

Similar letters refer to similar parts throughout the several views:

X is the base, Y the standard and Z the head of the scales to which we have applied our invention.

X', Figs. 5 and 6, are the weighing levers and X'' the weighing frame of the scales.

Y' is the connection joined at its lower end (see Figs. 5 and 6), to the weighing lever X' and at its upper end (see Fig. 2) to the weighing beam.

Z', Z'' and Z''' are members of the weighing beam, and are provided with sliding weights Y''' and Y'''' in the ordinary way. Weighing levers X' and the weighing frame X'' are mounted in the ordinary way, relative to each other and to the base X, as is well shown in Figs. 5 and 6. The connection Y' is the ordinary connection between the weighing levers of a scales and the weighing beam thereof and the weighing beam, mounted as shown and provided with members Z', Z'', Z''' is well known and forms no part of our invention. As no change is required or made by us in the mounting of these parts of a scales we can apply the device embodying our invention to any weighing scales of the type illustrated.

As we do not desire the scales to which our device is applied to be adjusted (for accuracy) by the person using the same, we mount the adjusting screw Z'''' on member Z'' of the weighing beam so that it is rotatable, (see Fig. 2), and non-rotatably mount the adjusting weight Z''''' on said members Z'' and on said screw Z''''. Screw Z'''' is not movable longitudinally, while weight Z''''' is movable longitudinally. Turning the screw Z'''', therefore, slides the weight Z''''' to accurately adjust the scales.

That portion of the mechanism which forms a part of the device embodying our invention which is positioned in or on the base X consists of a platform (A), which is mounted on the weighing frame X'' to move relative thereto, and levers (a, a'), which are movably mounted on the central bar of the weighing frame. Platform A (Figs. 1, 5, 6, 7, 8, and 9,), is pivoted at B (Figs. 6 and 7) to weighing frame X'' and is yieldingly held in a determined position relative to said weighing frame by spring b. Bolt b' limits the movement of platform A relative to frame X'', see Figs. 7, 8 and 9. By this arrangement a movement of the platform A on the weighing frame X'' is obtained by placing a person or thing on said platform, while said platform at the end of said movement rests firmly on the weighing frame beam and the same effect, so far as obtaining the weight of the person or thing on the platform, is obtainable, as if said platform were integral with the weighing frame, as in the ordinary construction.

Levers C, D, are pivotally mounted on the center bar X''' of the weighing frame X'' at C' and D', respectively (see Figs. 6 and 10). Levers C and D are in engagement with each other at their adjacent end as by fork E of lever C having end e of lever D therein.

F (Figs. 6 and 13) is a spring connected at one end to weighing frame X'' and at the other end to lever D, yieldingly holding up the end of said lever which said spring is connected to. The free end of lever C is yieldingly held near to the underside of the platform A, by spring F acting on lever D, as described, and hence said lever C is moved on its pivot C' by the movement of platform A on its pivot B, when a person steps on said platform or deposits a thing thereon to be weighed. Movement of lever C on its pivot C' moves lever D on its pivot D', so that the free end of said lever D moves downward and the connection Y'' which is connected at its lower end with said lever D is moved longitudinally downward thereby.

The several parts of the scales except the weighing beam and the mechanism forming elements in a device embodying our invention which are located in the base and standard of the scales are operative and operate in the same way (and as hereinbefore described) whether a coin (deposited in the slot which is provided therefor in head Z) is in the runway of the coin controlled device or not, and the lever G which is located in head Z, and is a part of the coin mechanism which we prefer to join to this mechanism, is also operated without reference to the deposit of a coin in the slot, by the downward movement of rod Y'' to have the end G'' thereof, with which the upper end y of connection Y'' is shown in engagement in Fig. 2, moved down, (thereby turning said lever G on its fulcrum g and moving the end g' thereof up).

H is a longitudinally movable rod, having its upper end h in a horizontal plane, which is longitudinally movable in bearings I, I' on plate J (see Fig. 3). The upper end h of connection H is in a horizontal plane to extend under member Z''' of the weighing beam and rests on bearing I'' (Figs. 3 and 4) when in its lowest position, so that said rod H is not at such time supported by end g' of lever G. When platform A is in its normal position the weighing beam is balanced but may be close to end h of rod H as is illustrated in Figs. 3 and 4.

When the end g' of lever G is moved up, in the manner hereinbefore described, the free ends of all the members of the weighing beam are moved up, and said weighing beam, so long as the free ends of the members thereof are held in this raised position by rod H is inoperative to record or register any weight of the person or thing on the platform A.

As the weighing beam of the scales is open to a person operating the device and scales, (for the purpose of sliding the weights on members Z'' and Z''' on the weighing beam, to obtain the correct weight of said person or thing), the free end of said weighing beam may when raised by rod H with a person standing on platform A, be forced down manually, and to avoid breakage or injury to any part of the device or scales in case said free end of the weighing beam is forced down, the lever G is made in two parts, end g' being pivotally attached to the remainder of said lever by pivot g'' (Fig. 2), and held in a determined position relative thereto by the spring G'. Spring G' is of sufficient strength to hold the end g' of said lever D in its determined position relative to the fulcrumed part of said lever but yields to permit the end g' to be forced down by the forcing down of the free end of the weighing beam.

The recording or registration of the weight of a person or thing on platform A being prevented by the above described mechanisms so long as the weighing beam is held up by lever D, we provide coin controlled mechanisms (not herein described) whereby the end y of connection Y'' is disengaged from end G'' of lever G upon the performing of certain determined operations, with said coin controlled mechanisms by the person who desires to obtain the record or register of a weighing. The operations required are, the deposit of a coin in the slot (see Fig. 1), the subsequent forcing down of the thumb piece L a predetermined distance, and the release and return of said thumb piece to its initial position.

The modification of the platform which is illustrated in Figs. 14 and 15, consists of the platform A' provided with posts M, M, and m, m, the posts N, N, provided with a recess in which the posts n, n, fit and are longitudinally movable, and the springs O, O, which are arranged to hold posts N, N, in a determined relation to posts n, n. P is a plate to which posts N, N, are secured. Plate P is provided with table p. The limit of movement of posts N, N, away from the under side of platform A' is determined by bolts Q which fit loosely in apertures in horizontal table p and are provided with heads q.

When platform A' is substituted for platform A the lower ends of posts M, M, and N, N, rest on the weighing frame of the scales used, the side bars of said frame being in recess S, S, and S', S', respectively. In this modification but one lever T is used in place of levers C, D, which is attached to the under side of platform A' by posts t, t'. When a person steps on platform A' the end thereof which has posts n, n, thereon is depressed, said posts entering deeper into the recesses therefor in posts N and the springs O, O, being compressed. The depression of the end of lever T which is shown in Fig. 14 as broken moves the connection y'' longitudinally down when this modification is substituted for platform A and levers C, D.

The position of the end of the connection Y'' relative to end G'' of lever G when the scales and said lever are in their normal position, with nothing on platform A is illustrated in Fig. 2.

When a person steps on platform A (or places a load thereon), the connection Y'' is moved longitudinally down, and the end y of said connection moves the end G'' of lever G down, as hereinbefore described, turning said lever on its pivot g, and thereby raising the end g' and also raising rod H and the weighing beam Z', Z'', Z''', so that no weight will be indicated thereby.

The upper end y of connection Y'' is bent at right angles to the remainder and lies in a horizontal plane and it will be observed from inspection of Fig. 1 that this end y rests on end G'' of lever G and may be slid off therefrom, and is therefore detachable from said lever G.

We claim:—

1. For scales provided with a weighing beam, weighing levers and a weighing frame mounted on the levers, the combination of a platform mounted on said weighing frame and movable relative thereto, means to yieldingly hold the platform and frame in a determined initial position, a lever movably mounted on the frame, a connection between the platform and lever, a longitudinally movable rod arranged to be actuated by said lever, and additional mechanism to which said longitudinally movable rod is detachably connected, the arrangement being such that said rod moves the weighing beam into a determined position on the change of the relative position of the platform and weighing frame.

2. The combination of a platform, posts on the underside of said platform, the posts at one end of the platform fulcrumed on the weighing frame of scales, springs interposed between the platform and the weighing frame to yieldingly hold the empty platform in a determined initial position relative to the frame with one end supported by said springs, and said platform arranged so that a weight placed thereon compresses said springs and moves the platform on its fulcrum from its initial position relative to the frame so that the end of the platform which is supported by the springs is supported directly by the weighing frame, a lever movably mounted on the frame, a connection between the platform and said lever, a longitudinally movable rod arranged to be actuated by said lever, and additional mechanism to which said longitudinally movable rod is detachably connected, the arrangement being such that said rod moves the weighing beam into a determined position on the change of the initial relative position of the platform and weighing frame.

3. The combination of a platform movably mounted on the weighing frame of scales provided with a weighing beam, means to yieldingly hold the platform and frame in a determined initial position, and said platform arranged so that a weight placed thereon moves it from its initial position relative to the frame, a lever movably mounted on the frame, means to move the lever on the relative movement of the platform and frame, a longitudinally movable rod arranged to be actuated by said lever, an additional lever, a connection between the movable rod and the additional lever, and an additional longitudinally movable rod engageable at its lower end with the additional lever and at its upper end with the weighing beam of the scales, the arrangement being such that said rods move the weighing beam into a determined position on the change of the relative position of the platform and weighing frame.

4. In scales provided with a weighing beam, the combination of a platform, posts on the under side of said platform, the posts at one end of the platform fulcrumed on the weighing frame of the scales, springs interposed between the platform and the weighing frame to yieldingly hold the empty platform in a determined initial position relative to the frame with one end supported by said springs, and said platform arranged so that a weight placed thereon compresses said springs and moves the platform on its fulcrum from its initial position relative to the frame so that the end of the platform which is supported by the springs is supported directly by the weighing frame, a lever movably mounted on the frame, means to move said lever on the movement of the platform compressing said springs, a longitudinally movable rod arranged to be actuated by said lever, and additional mechanism to which said longitudinally movable rod is detachably connected, the arrangement being such that said rod moves the weighing beam into a determined position on the change of the relative position of the platform and weighing frame.

5. The combination of a platform movably mounted on the weighing frame of scales, means to yieldingly hold the platform and frame in a determined initial position, and said platform arranged so that a weight placed thereon moves it from its initial position relative to the frame, a lever movably mounted on the frame, a connection between said platform and said lever, a longitudinally movable rod, a connection between said rod and said lever, and additional mechanism provided with a two part lever, to which said longitudinally movable rod is connected, means to hold the parts of said two part lever in a determined relative position, and an additional longitudinally movable rod positioned between the free end of the two part lever and the weighing beam, the arrangement being such that said last named rod moves the weighing beam into a determined position on the change of the relative position of the platform and weighing frame.

6. The combination of a platform, posts on the underside of said platform, the posts at one end of the platform fulcrumed on the weighing frame of a scales, a spring interposed between the platform and the weighing frame to yieldingly hold the empty platform in a determined initial position relative to the frame with one end supported by said spring, and said platform arranged so that a weight placed thereon compresses said spring and moves the platform on its fulcrum from its initial position relative to the frame so that the end of the platform which is supported by the spring is supported directly by the weighing frame, a lever movably mounted on the frame, a connection between the platform and the lever, a longitudinally movable rod which is actuated by said lever, and additional mechanism, a two part lever forming an element of the additional mechanism, to which lever said longitudinally movable rod is detachably connected, means to yieldingly hold the parts of said two part lever in a determined relative position, and an additional rod movably mounted between the two part lever and the weighing beam, the arrangement being such that said rods and two parts lever move the weighing beam into a determined position on the change of the relative position of the platform and weighing frame.

7. In combination with the weighing levers of a scales which is provided with a weighing beam and a connection between the weighing levers and the weighing beam, a platform movably mounted on the weighing levers and means to yieldingly hold the platform and weighing levers in a determined initial position relative to each other, and connecting mechanism between the platform and the weighing beam, all arranged so that when the initial relative position of the platform and weighing levers is changed the connecting mechanism moves the weighing beam into an inoperative position.

JOSEPH PAUPA.
GUSTAV F. HOCHRIEM.

In presence of—
CHARLES TURNER BROWN,
C. A. ADAMS.